United States Patent [19]
Chai

[11] Patent Number: 5,360,221
[45] Date of Patent: Nov. 1, 1994

[54] BABY CARRIAGE CONVERTIBLE TO A SAFETY CAR SEAT

[75] Inventor: Yoon Sick Chai, Seoul, Rep. of Korea

[73] Assignee: Ok J. Kim, Seoul, Rep. of Korea

[21] Appl. No.: 174,285

[22] Filed: Dec. 27, 1993

[30] Foreign Application Priority Data

May 19, 1993 [KR] Rep. of Korea .................. 93-8567

[51] Int. Cl.⁵ .................. B62B 7/06; B62B 7/12
[52] U.S. Cl. .................. 280/30; 280/643; 280/650; 297/256.15
[58] Field of Search .................. 280/30, 643, 648, 650; 297/130, 187, 256.15

[56] References Cited

U.S. PATENT DOCUMENTS

| | | |
|---|---|---|
| 2,720,911 | 10/1955 | Lantz .................. 280/30 |
| 4,685,688 | 8/1987 | Edwards . |
| 4,762,331 | 8/1988 | Tucker et al. . |
| 4,786,064 | 11/1988 | Baghdasarian .................. 280/30 |
| 4,822,064 | 4/1989 | Hunter . |
| 4,828,281 | 5/1989 | Sanchas . |
| 4,872,693 | 10/1989 | Kennel .................. 280/30 |
| 4,902,026 | 2/1990 | Maldonado .................. 280/30 |
| 4,946,180 | 8/1990 | Baer . |
| 4,984,813 | 1/1991 | Takahashi et al. .................. 280/30 |
| 5,022,669 | 6/1991 | Johnson .................. 280/30 |
| 5,188,380 | 2/1993 | Tacek .................. 280/30 |

FOREIGN PATENT DOCUMENTS

2659616 9/1991 France .................. 280/30

Primary Examiner—Brian L. Johnson
Attorney, Agent, or Firm—Darby & Darby

[57] ABSTRACT

A baby carriage serving as a safety seat. The carriage comprises a body assembly including seat, back, foot rest and side plates, a wheel assembly pivotally mounted on the body assembly and adapted to be folded back, a handle assembly pivotally mounted on the body assembly and adapted to be rotated into a horizontal position, and a locking assembly for locking and releasing the wheel assembly. When the carriage is converted into a safety seat, the wheel assembly is released from the locking assembly and folded back, and the handle assembly is rotated into a horizontal position to be used as an arm rest plate.

1 Claim, 8 Drawing Sheets

BABY CARRIAGE CONVERTIBLE TO A SAFETY CAR SEAT

BACKGROUND OF THE INVENTION

1. Field of the Invention

The present invention relates a baby carriage, and more particularly to a baby carriage capable of serving as a safety seat which is adapted to be mounted on a seat of an automobile to serve as a safety seat for a baby, as required.

2. Description of the Prior Art

In general, when it is necessary to let a baby ride in an automobile, a separate safety seat must be provided on a seat of the automobile, and on which the baby is safely seated.

However, the above-mentioned usual safety seat for a baby is limited only to a safety seat in actual application. Therefore, when it is necessary to remove the baby from the automobile and to walk with the baby, the guardian must hold the baby directly in his arms or always be equipped with a separate baby carriage.

SUMMARY OF THE INVENTION

Therefore, an object of the present invention is to overcome the above-mentioned disadvantages encountered in the prior arts and to provide a baby carriage serving as a safety seat which is adapted to be used as a baby carriage in case of ordinary use and also to be provided on a seat of an automobile so as to seat the baby safely.

In accordance with the present invention, the above object can be accomplished by providing a baby carriage serving as a safety seat comprising: a body assembly including a pair of side plates, seat and back plates fixedly interposed between the side plates, a foot rest plate disposed in front of the seat plate and pivotally interposed between the side plates, and a pair of body frames fixed to the side plates, said foot rest plate being moved between a horizontal position and a vertical position and having means for maintaining its horizontal position; a wheel assembly including a pair of front supporting legs which are pivotally connected at upper ends thereof to the side plates and fixed at lower ends thereof to a wheel shaft, a pair of rear supporting legs fixedly spaced from each other by a spacing bar, which are pivotally connected at upper ends thereof to the side plates and has at lower ends thereof rotatable vertical shafts, connecting bars pivotally connected between middle portions of the front supporting legs and middle portions of the rear supporting legs, a pair of front wheels rotatably connected to the both ends of the wheel shaft, and a pair of rear wheels rotatably connected to the vertical shafts of the rear supporting legs; a handle assembly including a pair of handle frames pivotally connected to middle portions of the side plates, a handle interposed between free ends of the handle frames, and an arm rest plate disposed below the handle and interposed between the handle frames; and a locking assembly including a body plate disposed below the seat plate and pivotally connected between the side plates, and means for causing the body plate to be moved upward, said body plate being provided at its free end with locking means for gripping the spacing bar; whereby the spacing bar of the wheel assembly is released from the locking means of the locking assembly for allowing the wheel assembly to be retracted rearward and upward and the handle assembly is rotated into a horizontal position from a vertical position for allowing the arm rest plate of the handle assembly to be used in its original use when the carriage is converted into a safety seat.

BRIEF DESCRIPTION OF THE DRAWINGS

Other objects and advantages of the present invention will become apparent from the following description of embodiments with reference to the accompanying drawings in which.

DETAILED DESCRIPTION OF THE PREFERRED EMBODIMENTS

An embodiment according to the present invention will be now described in more detail with reference to the accompanying drawings.

Figure 1:
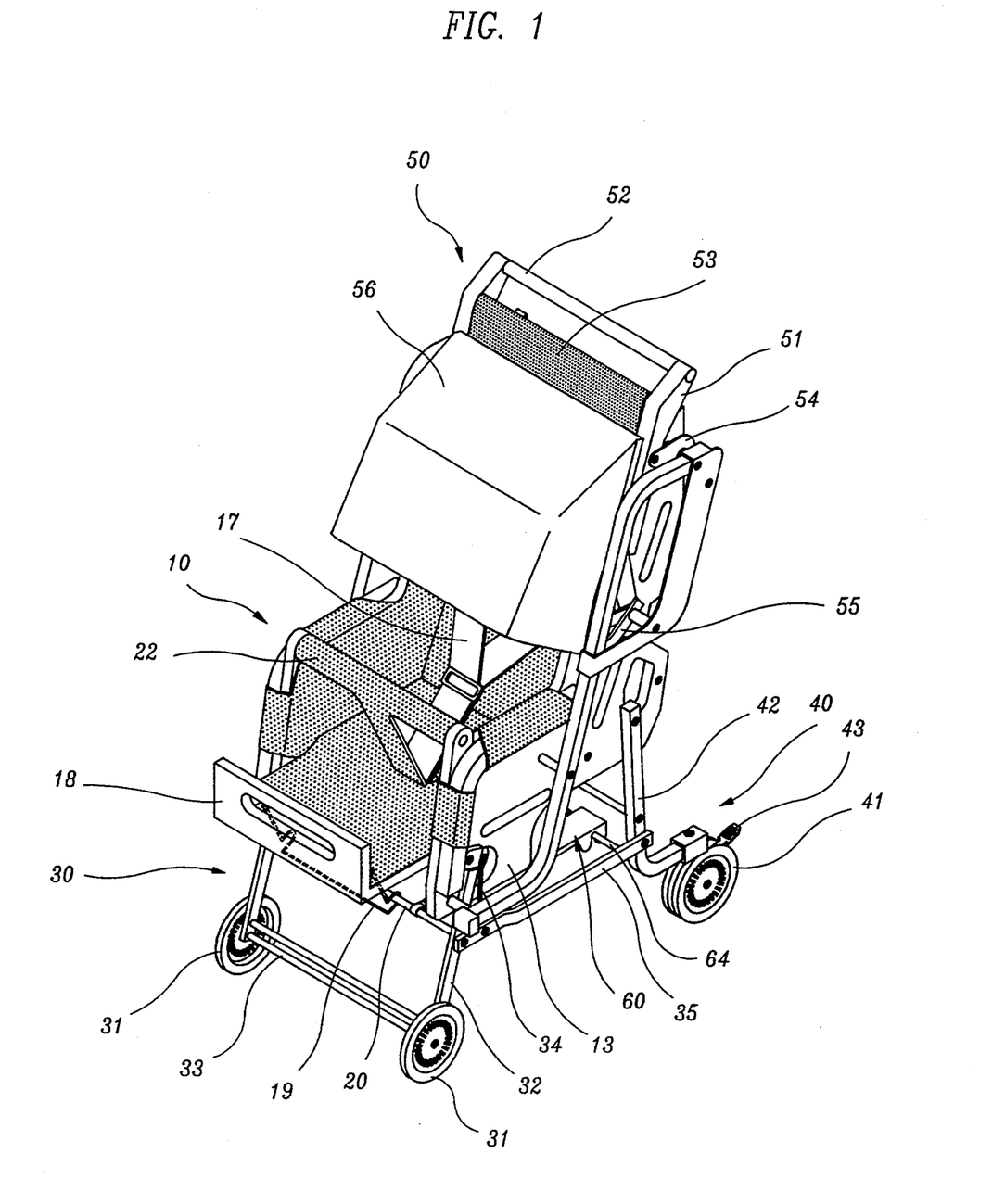
FIG. 1 is a perspective view of a baby carriage serving as a safety seat according to the present invention.

Referring to FIG. 1, there is shown a perspective view of a baby carriage serving as a safety seat according to the present invention. As shown in the drawing, the baby carriage of the invention comprises largely a carriage body part 10, a front wheel part 30 provided at a front and lower portion of the carriage body part 10, a rear wheel part 40 provided at a rear and lower portion of the carriage body part 10, a handle part 50 provided at a rear and upper potion of the carriage body part 10, and a locking assembly 60 provided at a lower portion of the carriage body part 10.

Figure 2:
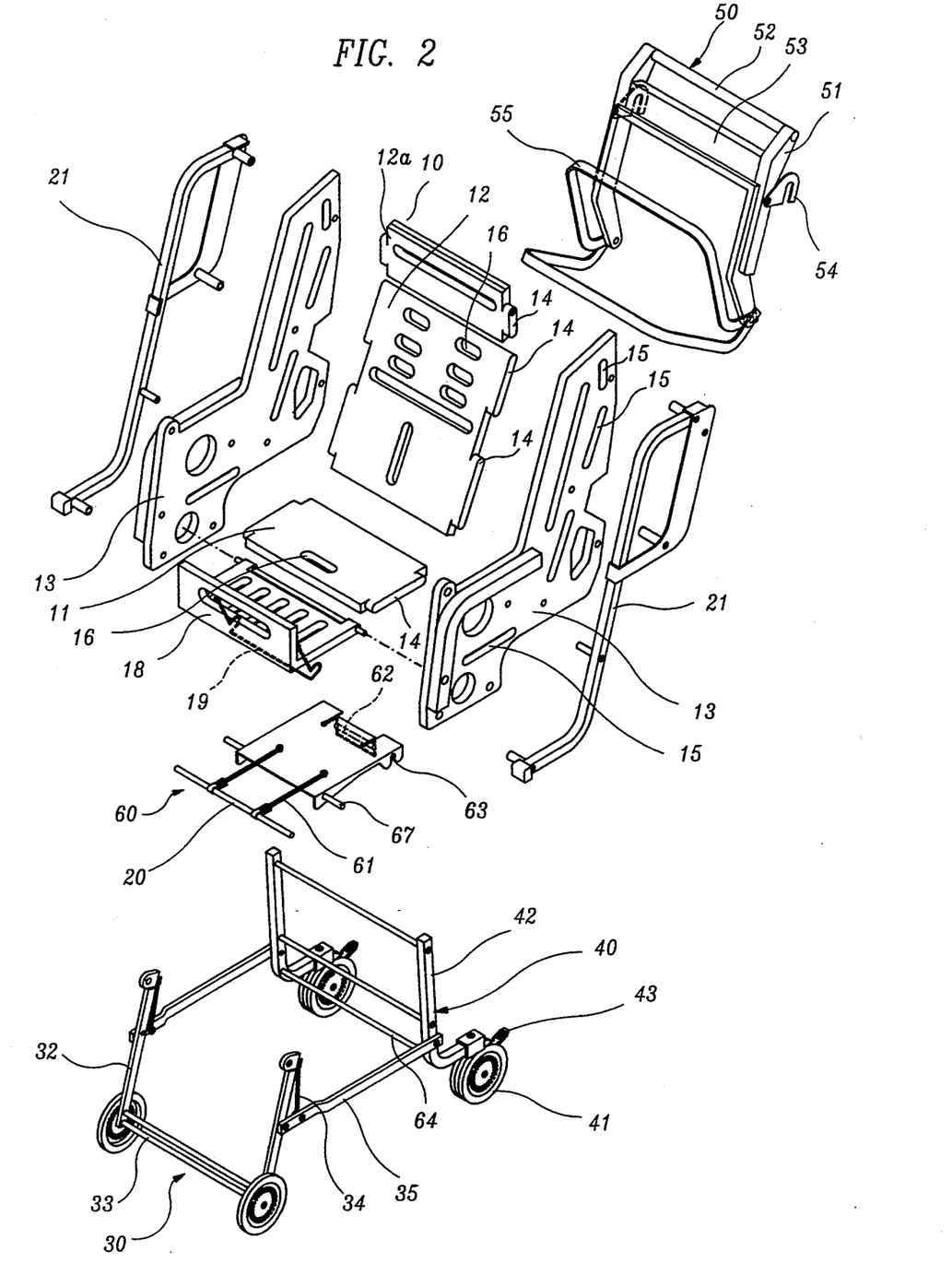
FIG. 2 is an exploded perspective view of FIG. 1.

Referring to FIG. 2, there is shown the baby carriage of the invention, which is exploded. As shown in the drawing, the carriage body Dart 10 includes a seat plate 11, a back plate 12, an upper back plate 12a and side plates 13 which are combined with one another. Each of the seat, back and upper plates 11, 12 and 12a is integrally formed with fitting ribs 14 at right and left sides thereof. In addition, each of the side plates 13 is formed with fitting slots 15 each of which corresponds to each of the fitting ribs 14 of the seat, back and upper back plates 11, 12 and 12a such that each of the fitting ribs 14 is fitted into the fitting slots 15.

The seat plate 11 and the back plate 12 are formed with belt coupling holes 16 so that a safety belt 17 (see FIG. 1) is inserted into the belt coupling holes 16. A foot rest plate 18 is pivotally interposed between front ends of the left and right side plates 13 so that the foot rest plate 18 is movable between a horizontal position and a downward extending position. The foot rest plate 18 is provided with a supporting wire 19. The supporting wire 19 is pivotally connected to the foot rest plate 18 and has an inward concave U-shaped recess. Therefore, when the foot rest plate 18 is in the horizontal position, the U-shaped recess of the supporting wire 19 is engaged with a front frame shaft 20 fixed between the side plates 13 to support the foot rest plate 18 in the horizontal position, as described hereinafter.

Each of the right and left side plates 13 of the carriage body part 10 is coupled at its outer surface with a S-shaped body frame 21 with a predetermined spacing therebetween so that whole components of the carriage body part 10 is firmly maintained. A guide bar 22 is horizontally interposed between upper portions of front side of the right and left side plates 13 so as to prevent the baby seated in the carriage from slipping out.

Referring again to FIGS. 1 and 2, the front wheel part 30 includes a pair of front wheels 31 rotatably supported on opposite ends of a front wheel shaft 33, and a pair of front supporting legs 32 fixed to the opposite ends of the front wheel shaft 33 and extending upward and rearward. That is. the front wheels 31 are rotatably supported to the opposite ends of the front wheel shaft 33, and the front supporting legs 32 are fixed to the opposite ends of the front wheel shaft 33 at lower ends thereof and pivotally supported on outer surfaces of front ends of the side plates 13. Each of the front supporting legs 32 is provided with a connecting bar 35. The connecting bar 35 is pivotally connected to a middle portion of the front supporting leg 32. Connected between the upper end of the front supporting leg 32 and a portion of the connecting bar 35 somewhat spaced from its front hinge point is a tension spring 34. Therefore, when the front and rear wheel part 30 and 40 are folded back, the front and rear wheel parts can be easily folded back by means of the tension spring 34 so that the front and rear wheels are received in spaces between the side plates 13 and the body frames 21.

As shown in FIG. 2, the rear wheel part 40 includes a pair of rear double-type wheels and an L-shaped rear supporting legs 42 for supporting the rear wheels. The double-type wheel has a pair of wheels spaced from each other and an intermediate pin interposed between the pair of wheels. The L-shaped rear supporting leg 42 is provided with a supporting shaft at its lower end. The supporting shaft is rotatably inserted in the lower end of the rear supporting leg 42 and fixed to the intermediate pin, so that the double-type wheel is rotatable with respect to the rear supporting leg 42. A predetermined number of spacing bars 64 are fixed between the rear supporting legs 42 for maintaining its parallel structure. The L-shaped supporting leg 42 is pivotally connected on a surface of a rear portion of the side plate 13 at its upper end, the rear end of the connecting bar 35 is also pivotally connected to a middle portion of the rear supporting leg 42, so that the rear wheel part 40 is folded back together with the front wheel part 30. In addition, the double-type rear wheel is provided with an usual stop lever 43 for stopping rotation of the wheel.

Figure 4:
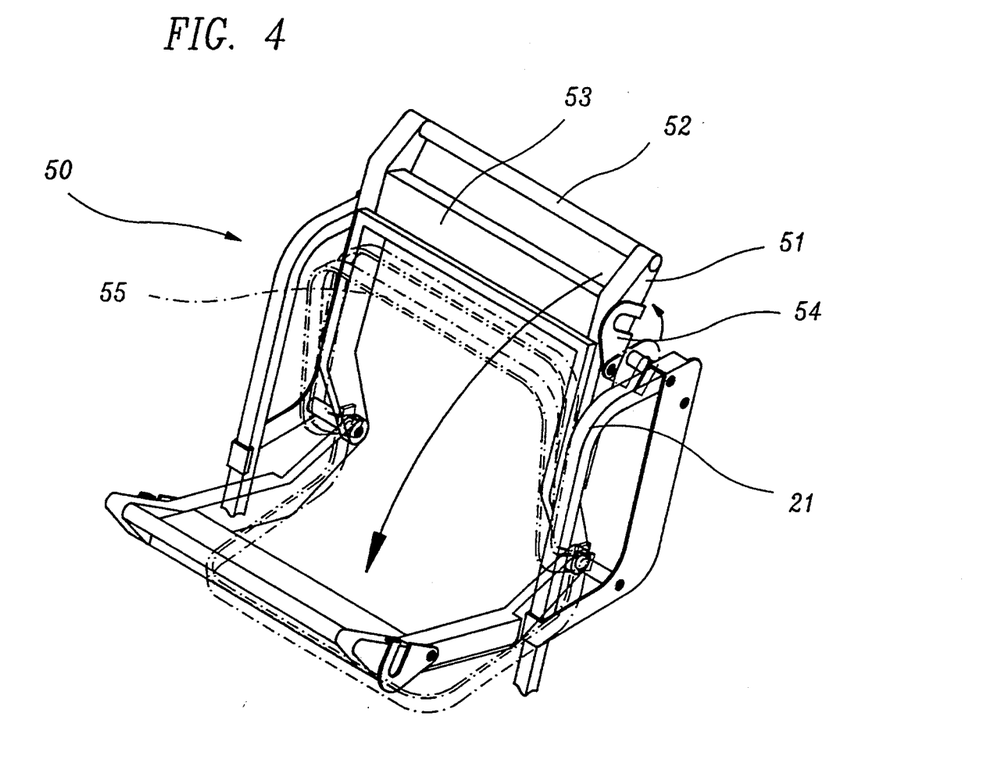
FIG. 4 is an enlarged perspective view of a handle part according to the invention.

Referring to FIG. 4, there is shown the handle part of the invention. As shown in FIGS. 2 and 4, the handle part 50 includes a pair of handle frames 51 pivotally connected to middle portions of rear sides of the side plates 13, a handle 52 interposed between the upper ends of the handle frames 51, and an arm rest plate 53 interposed between the handle frames 51 and below the handle 52. The handle frame 51 is provided with a rotatable locking hook 54. The locking hook 54 is adapted to be engaged with a locking pin formed at the upper end of the S-shaped body frame 21 so that pivotal movement of the handle frames 51 is locked. When it is necessary to be used as a safety seat, the locking hook 54 is disengaged from the hook pin, so that the handle frames 51 can be moved in the direction of arrow in FIG. 4. In this condition, arms of the seated baby can be comfortably put on the arm rest plate 53. Sun visor frames 55 attached to inner surface of a sun visor sheet 56 are pivotally connected to the hinge points of the handle frames 51 so that the sun visor sheet 56 is extended and folded.

Figure 3:
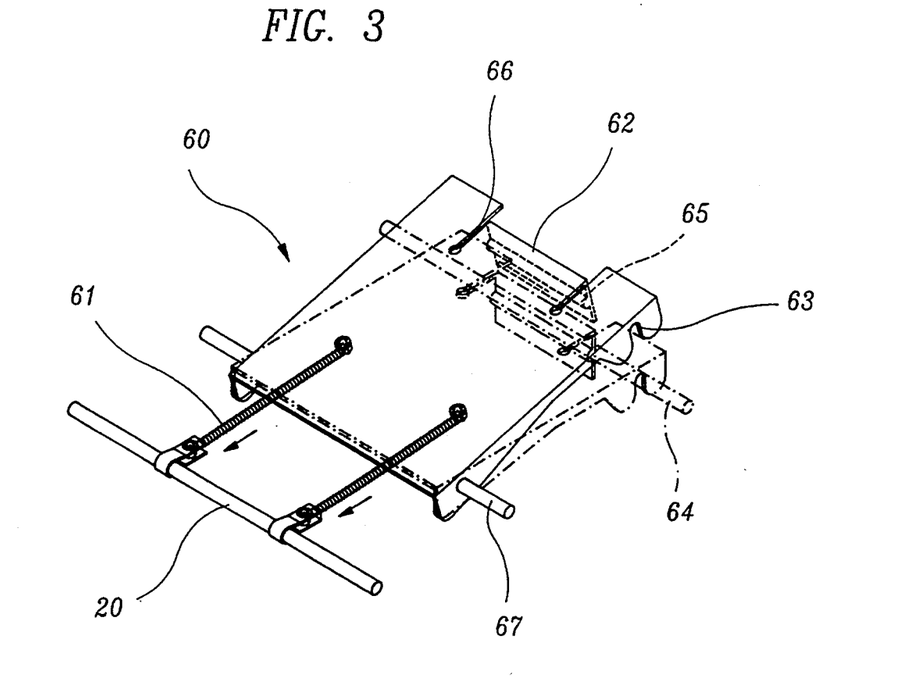
FIG. 3 is an enlarged perspective view of a locking assembly according to the invention.

Referring to FIG. 3, there is shown the locking assembly of the invention, which is adapted to maintain a baby carriage structure when the carriage serves as a baby carriage. As shown in the drawing, the locking assembly 60 comprises a hexahedral box member opening downward and forward. The box member is provided at its front end with a hinge pin 67 passing therethrough. The hinge pin is inserted into holes formed at the side plates 13 so that the box member is pivotally moved upward and downward. The box member is formed at its rear end with locking recesses 63 opening downward. The box member is also integrally formed at its rear side with a resilient board 62 extending downward. A pair of longitudinal slits 66 are formed at both sides of the bent portion of the resilient board 62 so as to provide the resilient board with more abundant resiliency. The resilient board 62 is formed at its inner surface with a lateral groove 65 which is aligned with the locking recesses 63. Therefore, when the spacing bar 64 of the rear wheel part 40 is engaged with the locking recesses 63 and the lateral groove 65, the box member can be easily separated from the spacing bar 64 by the inward resilient force of the resilient board 62. Fixed to upper surface of the box member are tension springs 61. The other ends of the tension springs 61 are connected to the front frame shaft 20 fixed between the side plates 13. Hence, when the box member is disengaged from the spacing bar 64 of the rear wheel part 40, the box member is pivotally moved upward by the tension springs 61 and the front and rear wheel parts 30 and 40 can be pivotally moved rearward with respect to the carriage body part 10.

Operation of the baby carriage according to the present invention will now be described with reference to FIGS. 5A to 5E.

Figure 5A:
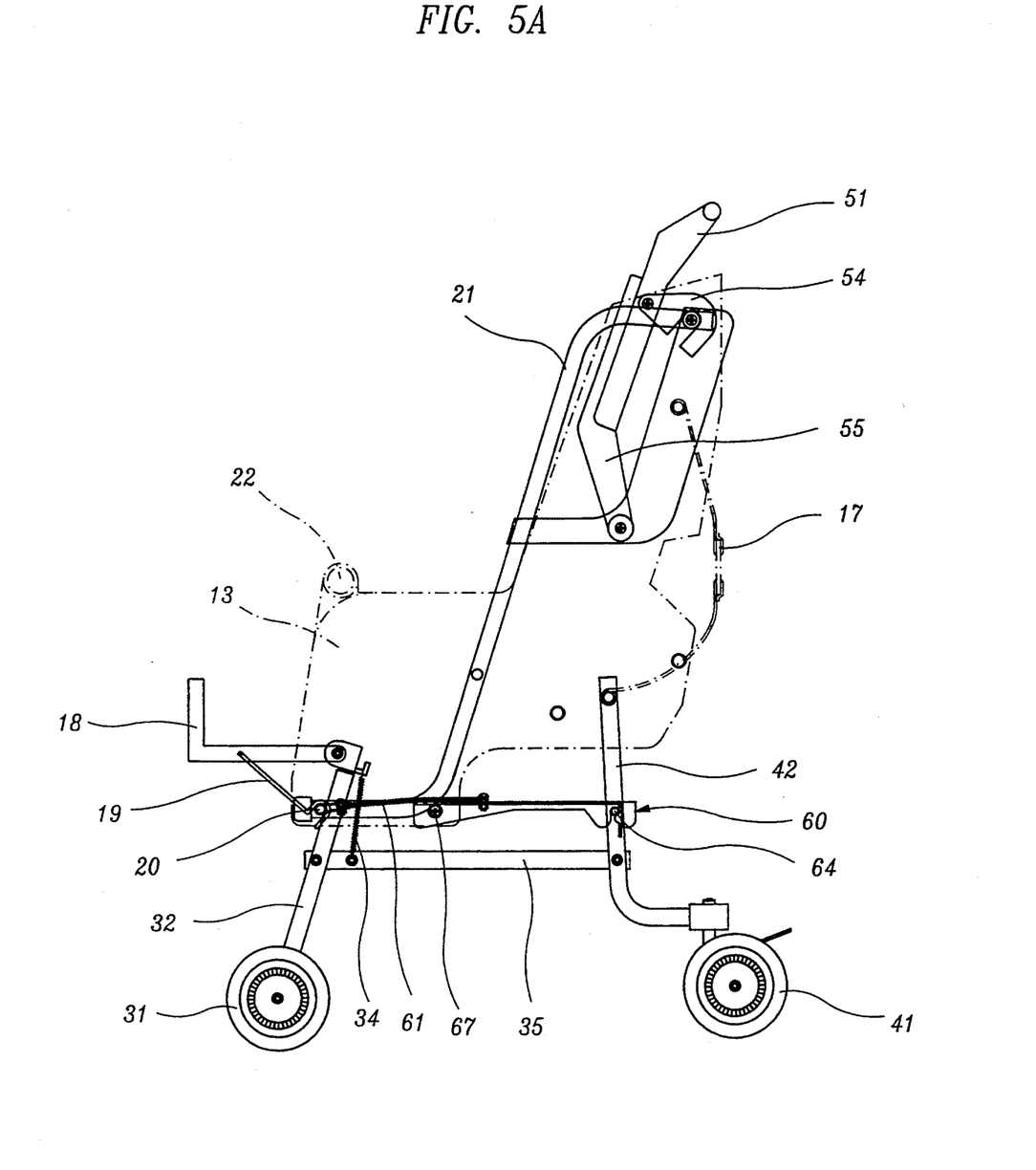
FIG. 5A is a side view showing operation for converting a baby carriage structure into a safety seat, in which the carriage is used as baby carriage.

In case of converting the carriage of the invention as shown in FIG. 5A into a safety seat, the resilient board 62 of the locking assembly 60 is first pulled rearward and raised upward by the user's fingers. Then, the box member of the locking assembly 60 is disengaged from the spacing bar 64 and pivotally moved upward by means of the tension springs 61, thereby achieving a condition capable of converting into a safety seat, as shown in FIG. 5B.

Figure 5B:
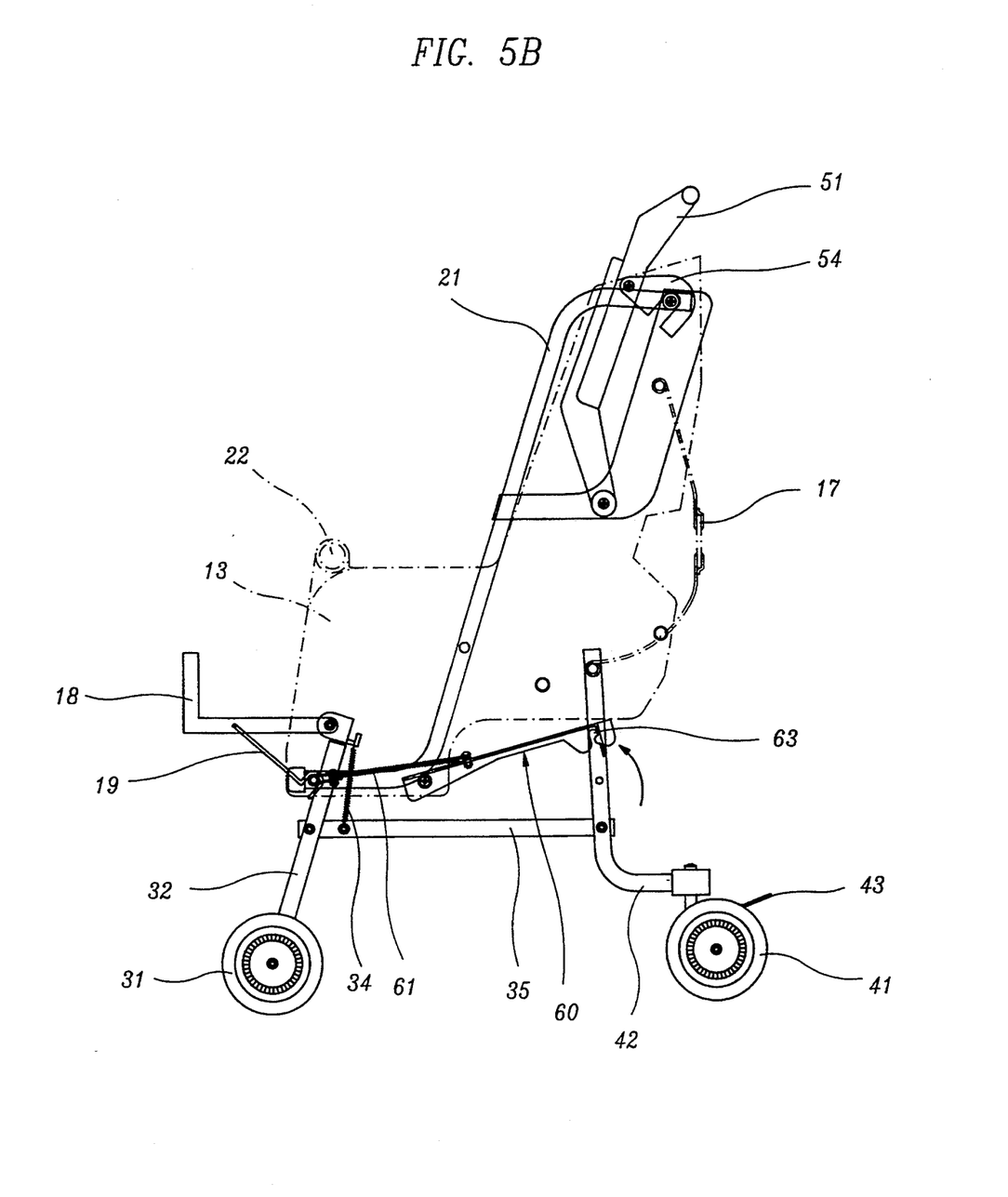
FIG. 5B is a view similar to FIG. 5A, in which the locking assembly is disengaged from a rear wheel part.
Figure 5C:
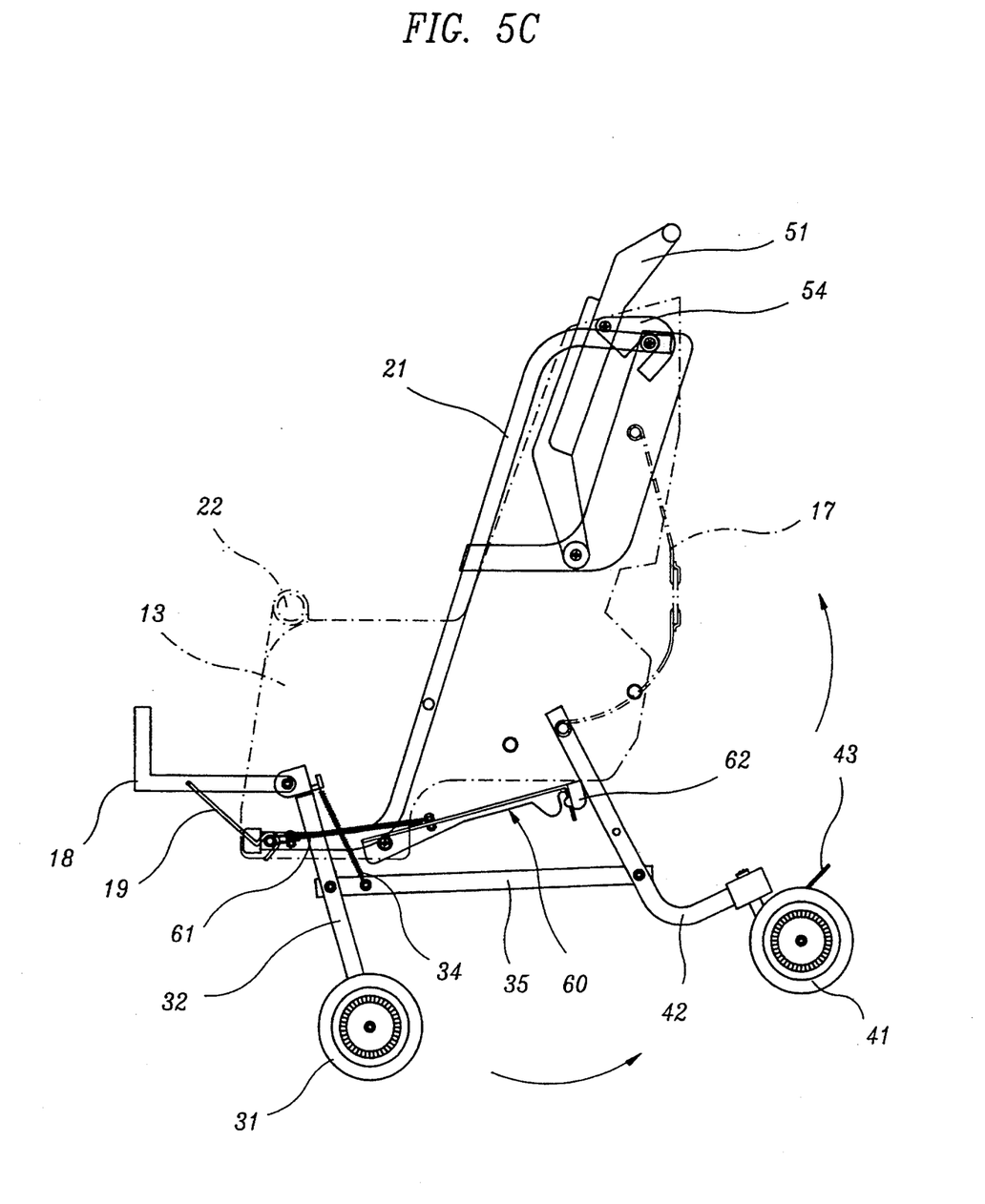
FIG. 5C is a view similar to FIG. 5A, in which the front and rear wheel parts are moved rearward.

From the condition shown in the FIG. 5B, the front wheel part 30 is pushed rearward. Then, the front supporting legs 32 are moved rearward with respect to the carriage body part 10, and at the same time the rear supporting legs 42 are also moved rearward by means of the connecting bars 35 pivotally connected therebetween, thereby lowering whole height of the carriage, as shown in FIG. 5C.

Figure 5D:
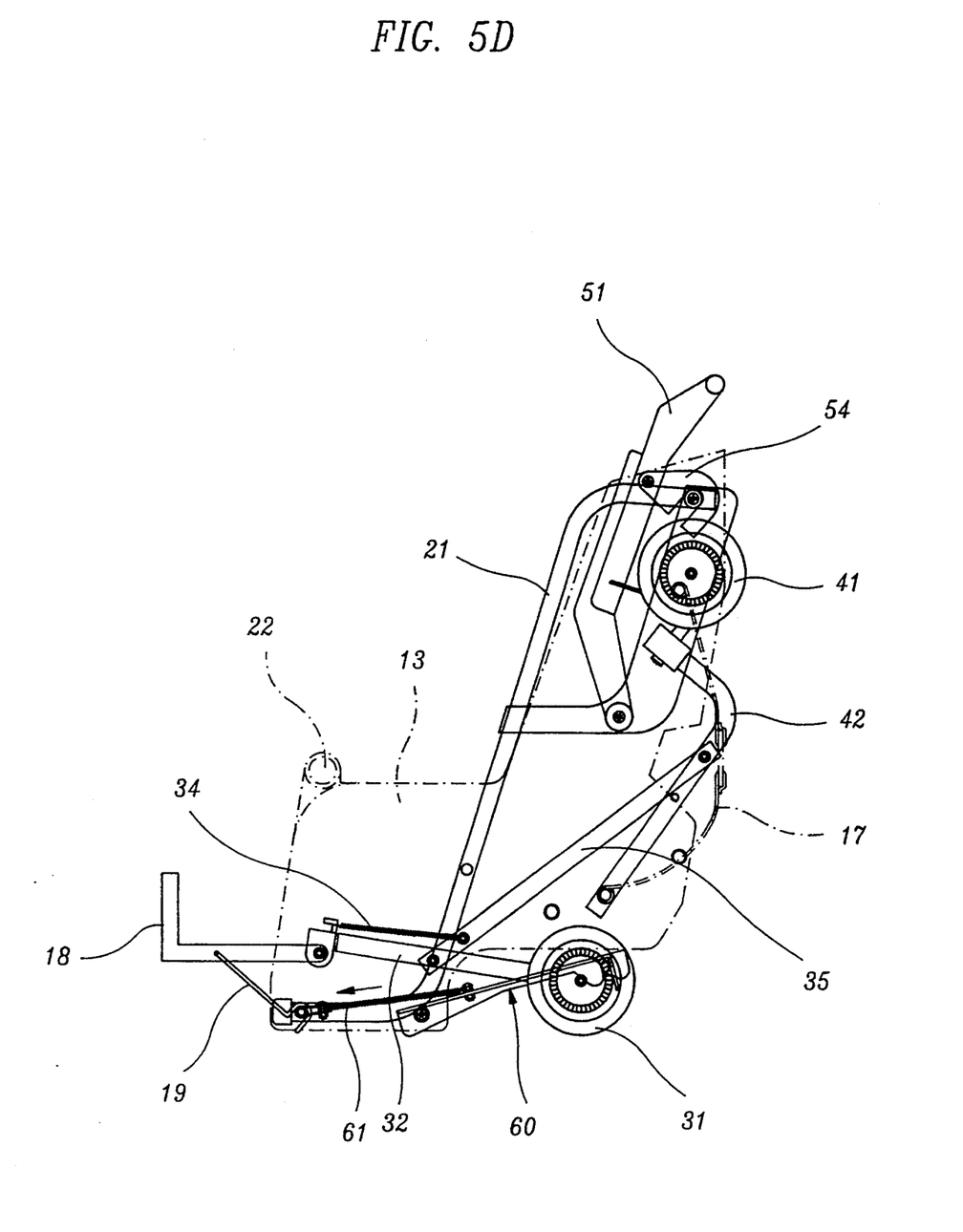
FIG. 5D is a view similar to FIG. 5A, in which the front and rear wheel parts are completely retracted upward.

From this condition, the rear wheel part 40 and thus the front wheel part 30 are raised upward with respect to hinge points thereof, so that the front and rear wheels 31 and 41 of the front and rear wheel parts 30 and 40 are received in the spaces defined between the S-shaped body frame 21 and the side plates 13, as shown in FIG.

5D. At this time, because of the tension springs 34 connected between the upper ends of the front supporting legs 32 and the connecting bars 35, the front and rear wheel parts 30 and 40 can be maintained in the condition as shown in FIG. 5D.

Figure 5E:
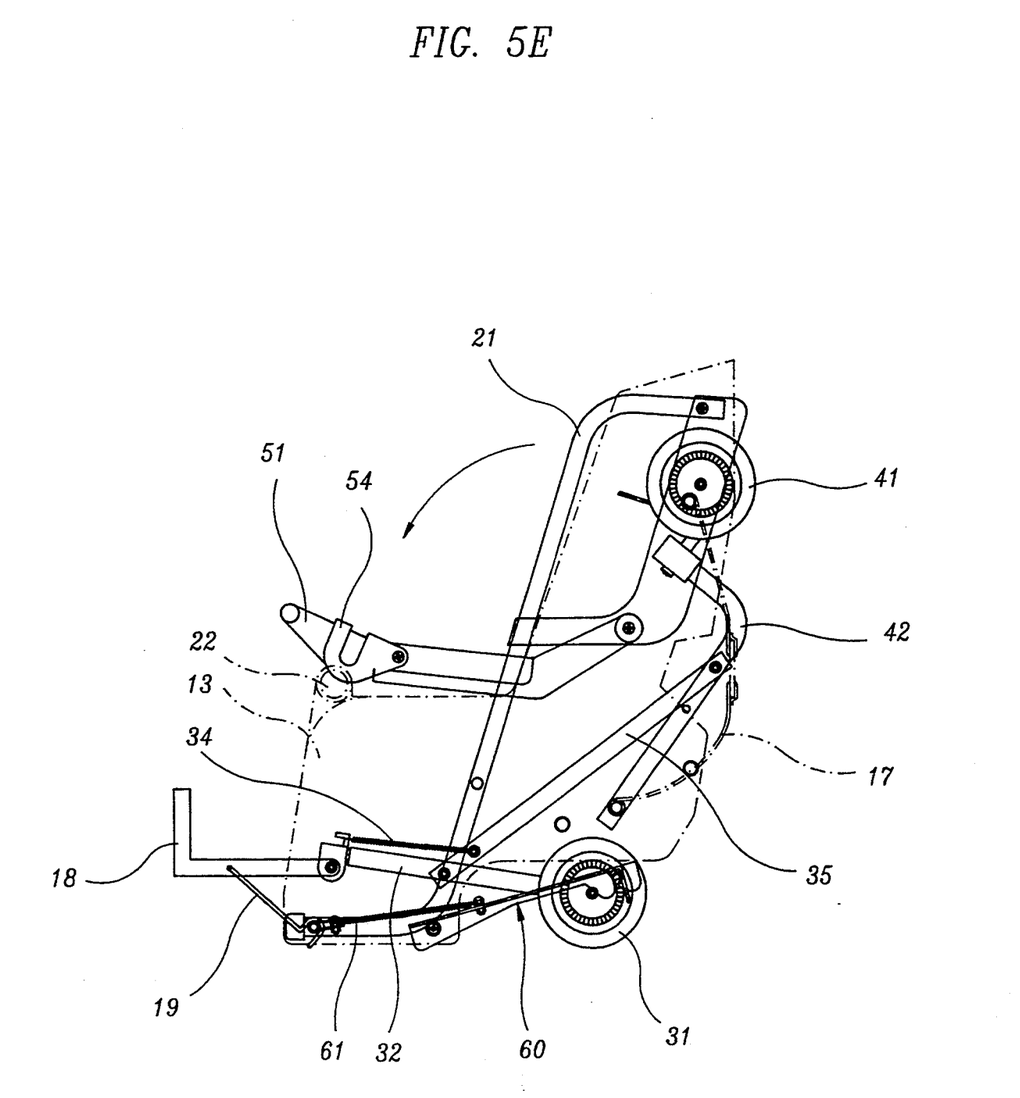
FIG. 5E is a view similar to FIG. 5A, in which a handle part is lowered into a position of safety seat.

After the front and rear wheel parts 30 and 40 are completely retracted as mentioned above, the locking hook 54 of the handle part 50 is disengaged from the locking pin of the body frame 21. Then, the handle frames 51 are rotated forward with respect to hinge points thereof, so that the arm rest plate 53 interposed between the handle frames 51 is disposed on the guide bar 22, as shown in FIG. 5E. Accordingly, the operation for converting the carriage into the safety seat is completed.

On the other hand, in case of converting the safety seat into the baby carriage, the above-mentioned operation procedures is carried out reversely. That is, the front and rear wheel parts 30 and 40 are extended into the position of original carriage, and then the locking recesses 63 and the groove 65 of the locking assembly 60 are engaged with the spacing bar 64. Thereafter, the handle frames 51 are rotated upward and then the locking hook 54 is engaged with the locking pin of the body frame 21. Accordingly, the carriage is firmly maintained in the condition of baby carriage.

As apparent from the above description, since the baby carriage serving as a safety seat according to the present invention can be easily converted between the structures of the baby carriage and the safety seat for an automobile, the carriage of the invention can be used as the baby carriage and the safety seat according to required use.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. A baby carriage convertible to a safety seat comprising:

a body assembly including a pair of side plates, seat and back plates fixedly interposed between the side plates, a foot rest plate disposed in front of the seat plate and pivotally interposed between the side plates, and a pair of body frames fixed to the side plates, said foot rest plate being moved between a horizontal position and a vertical position and having means for maintaining the horizontal position;

a wheel assembly including a pair of front supporting legs which are pivotally connected at upper ends thereof to the side plates and fixed at lower ends thereof to a wheel shaft, a pair of rear supporting legs fixedly spaced from each other by a spacing bar, which are pivotally connected at upper ends thereof to the side plates and have at lower ends thereof horizontal shafts, connecting bars pivotally connected between middle portions of the front supporting legs and middle portions of the rear supporting legs, a pair of front wheels rotatably connected to the both ends of the wheel shaft, and a pair of rear wheels rotatably connected to the horizontal shafts of the rear supporting legs;

a handle assembly including a pair of handle frames pivotally connected to middle portions of the side plates, a handle interposed between free ends of the handle frames, and an arm rest plate disposed below the handle and interconnected between the handle frames; and a locking assembly including a body plate disposed below the seat plate and pivotally connected between the side plates, and means for causing the body plate to be moved upward, said body plate being provided at a free end with locking means for gripping the spacing bar;

whereby the spacing bar of the wheel assembly is released from the locking means of the locking assembly for allowing the wheel assembly to be retracted rearward and upward and means for allowing rotation of the handle assembly into a horizontal position from a vertical position for allowing the arm rest plate of the handle assembly to be moved to a generally horizontal use position when the carriage is converted the safety seat.

* * * * *